United States Patent
Fischer et al.

(10) Patent No.: US 7,845,714 B2
(45) Date of Patent: Dec. 7, 2010

(54) HYBRID-STRUCTURE ASSEMBLY SUPPORT

(75) Inventors: Andreas Fischer, Herborn (DE); Robert Raulf, Bad Waldliesborn (DE)

(73) Assignee: HBPO GmbH, Lippstadt (DE)

( * ) Notice: Subject to any disclaimer, the term of this patent is extended or adjusted under 35 U.S.C. 154(b) by 113 days.

(21) Appl. No.: 12/094,664

(22) PCT Filed: Nov. 23, 2006

(86) PCT No.: PCT/EP2006/011225

§ 371 (c)(1),
(2), (4) Date: Nov. 13, 2008

(87) PCT Pub. No.: WO2007/059954

PCT Pub. Date: May 31, 2007

(65) Prior Publication Data

US 2009/0212600 A1   Aug. 27, 2009

(30) Foreign Application Priority Data

Nov. 23, 2005   (DE) .................. 10 2005 055 705

(51) Int. Cl.
*B60N 99/00* (2006.01)
(52) U.S. Cl. ..................... 296/193.09; 296/203.02
(58) Field of Classification Search ............ 296/193.09, 296/203.02
See application file for complete search history.

(56) References Cited

U.S. PATENT DOCUMENTS 6,412,855 B1 * 7/2002 Cantineau et al. ...... 296/193.09
6,547,317 B1 * 4/2003 Cheron et al. .......... 296/193.09
6,685,258 B2 * 2/2004 Brogly et al. .......... 296/193.09
7,073,848 B2 * 7/2006 Lee ....................... 296/193.09

FOREIGN PATENT DOCUMENTS

| DE | 20310156 | 9/2003 |
| EP | 0995668 | 4/2000 |
| EP | 1211164 | 5/2002 |

OTHER PUBLICATIONS

International Search Report for PCT/EP2006/011225, Feb. 5, 2007, European Patent Office.
WO2004/056610, Staargarrd et al., Jul. 8, 2004, United States.

* cited by examiner

*Primary Examiner*—Lori L Lyjak
(74) *Attorney, Agent, or Firm*—Bourque & Associates, P.A.

(57) ABSTRACT

An assembly support with hybrid structure for front ends of passenger vehicles and light trucks includes an upper cross member (1), a lateral member (2) attached to it from below with a flange plate (3) for connection with the face ends of vehicle longitudinal members and a lower cross member (4) connecting the lower sections (2.1) of these lateral members (2). In order to reinforce the assembly support in the area of the lower cross member (4), the lower cross member (4) consists of a shell body (5) with a flange (5.1) running along its edge and projecting outward, and of a sealing part (6) whose edge area overlaps it. The shell body (5) and the sealing part (6) are made of a stiff material, whereby the flange (5.1) and edge areas (6.1) of the above-mentioned components are surrounded by injected plastic used for the hybrid structure, and are thus bound together with the lateral members (2).

8 Claims, 3 Drawing Sheets

HYBRID-STRUCTURE ASSEMBLY SUPPORT

TECHNICAL FIELD

The invention relates to an assembly support for, in one example, the front end of passenger vehicles and light trucks and more particularly, to a hybrid structure for such supports including a combination of metal and plastic components.

BACKGROUND INFORMATION

Such specific assembly supports with hybrid structure for front ends of passenger vehicles and light trucks are normal in modern vehicle production, and are therefore generally known. Hybrid components of this type distinguish themselves by good usage properties that are seen regarding their low weight relative to the technological properties such as stiffness and/or strength. Further, the hybrid components allow low-cost manufacture using the injection-molding process. In the known version, the assembly supports include hybrid structures with shell shape on whose concave side reinforcing plastic ribs are provided. The stiffness of each assembly support thus achieved may still be inadequate in those areas in which large forces are applied, for example, by engine mounts. This applies to the lower areas of the assembly support, particularly its lower cross member.

It is fundamentally known from DE 203 10 156 U1 to use shaped metal parts when constructing automobiles that consist of two shaped metal parts or of two shaped metal plates that include flat and completely overlapped edge sections and are provided with perforations in these edge sections. The edge sections are injected with, and surrounded by, plastic, whereby the plastic presses through the perforations in the edge sections, surrounding the end edges. The shaped metal profiles are connected together in this manner.

SUMMARY

It is one task of the invention to provide an assembly support of the type mentioned at the outset and using the technique mentioned above that is reinforced in the area of the lower cross member and the lateral member lower sections.

This task is solved by a assembly support of the above-mentioned type by the distinguishing characteristics of Patent Claim 1.

It is essential to the assembly support based on the invention that its lower cross member and the lateral member lower sections are formed as enclosed stiffening shaped parts that consist of a stiff material, preferably metal, and include two matching parts, namely the shell bodies and the enclosing parts that, by means of plastic used for the hybrid design, are firmly attached not only together, but also with the adjacent areas of the assembly support. Thus, not only do the lower cross member and the lateral member lower sections of the assembly support bear strong torsion and bending forces, but they also stiffen the assembly support above the adjacent lateral members overall.

Other advantageous embodiment characteristics of the invention may be taken from the Dependent Claims.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
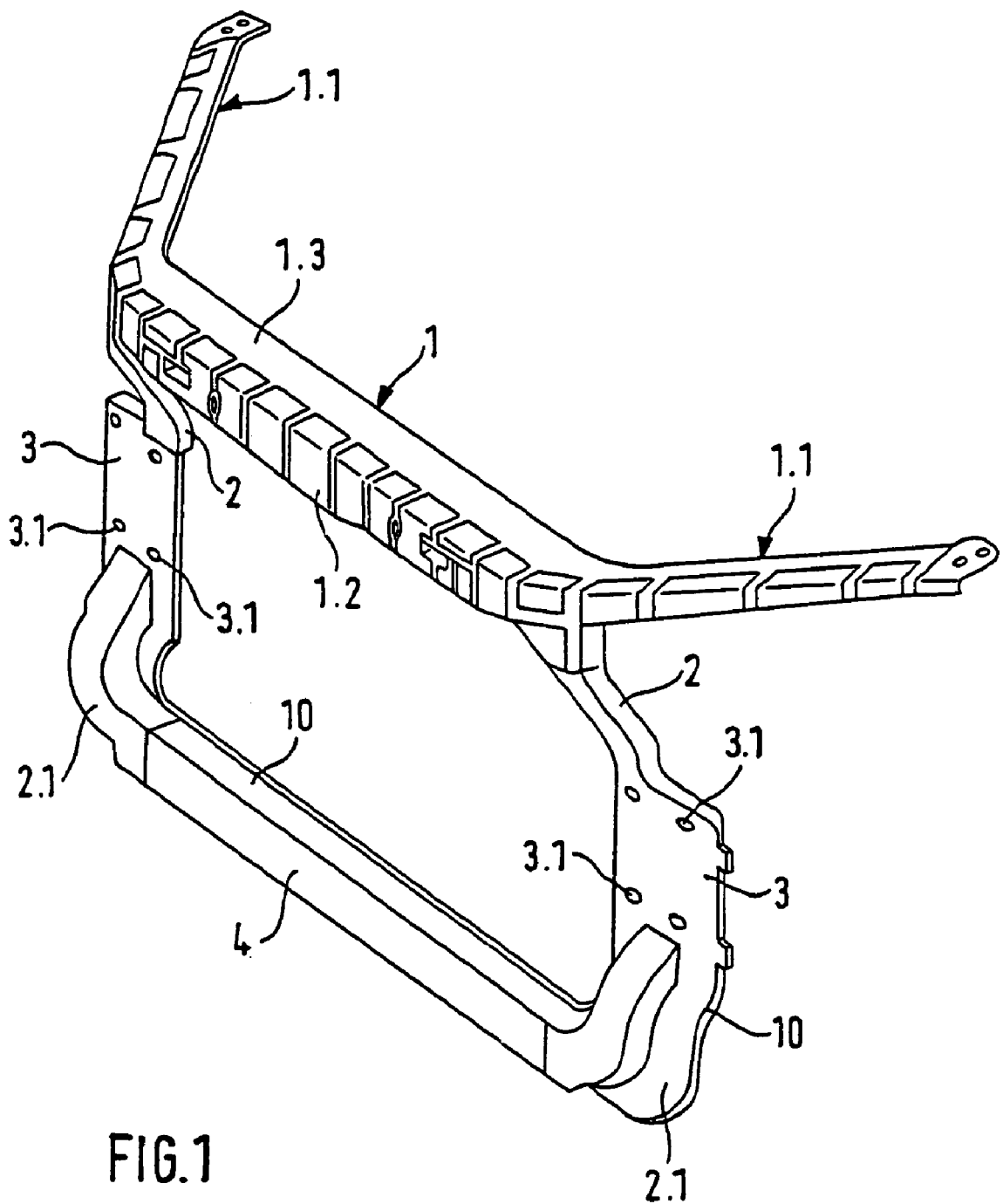
FIG. 1 is a perspective view of an assembly support for a front end of a passenger car, seen from the front.

Specifically, in the assembly support shown in FIG. 1, one may recognize an upper cross member 1 to which lateral members 2 connect from below. At both ends, the upper cross member 1 includes attachment arms 1.1 that extend beyond the upper cross member 1 above the adjoining areas of the lateral member 2. Flange plates 3 are incorporated into the lateral member 2 that include penetrating holes 3.1 for threaded attachment with opposing flange plates located on the front face ends of the vehicle longitudinal member. Lower sections 2.1 of the lateral member 2 connect downward to the flange plates 3, between which a lower cross member 4 extends.

The assembly support shown in FIG. 1 is a hybrid component consisting of stiff elements, namely those of steel, and of plastic binding these elements together and reinforcing certain areas. Details may be taken from FIG. 2. The upper cross member 1 of the assembly support includes a metal member 1.2 that consists of hollow parts open to the rear. This metal member 1.2 is reinforced by means of plastic spars 1.3 and ribs 1.4 that are located within the hollow area of the metal member. A plastic sheathing or border 10 is of one piece with the plastic spars 1.3 and the plastic ribs 1.4, from which its line-shaped progression may essentially be seen in FIG. 2. More discussion of these plastic areas based on FIGS. 3 and 4 will follow.

Figure 2:
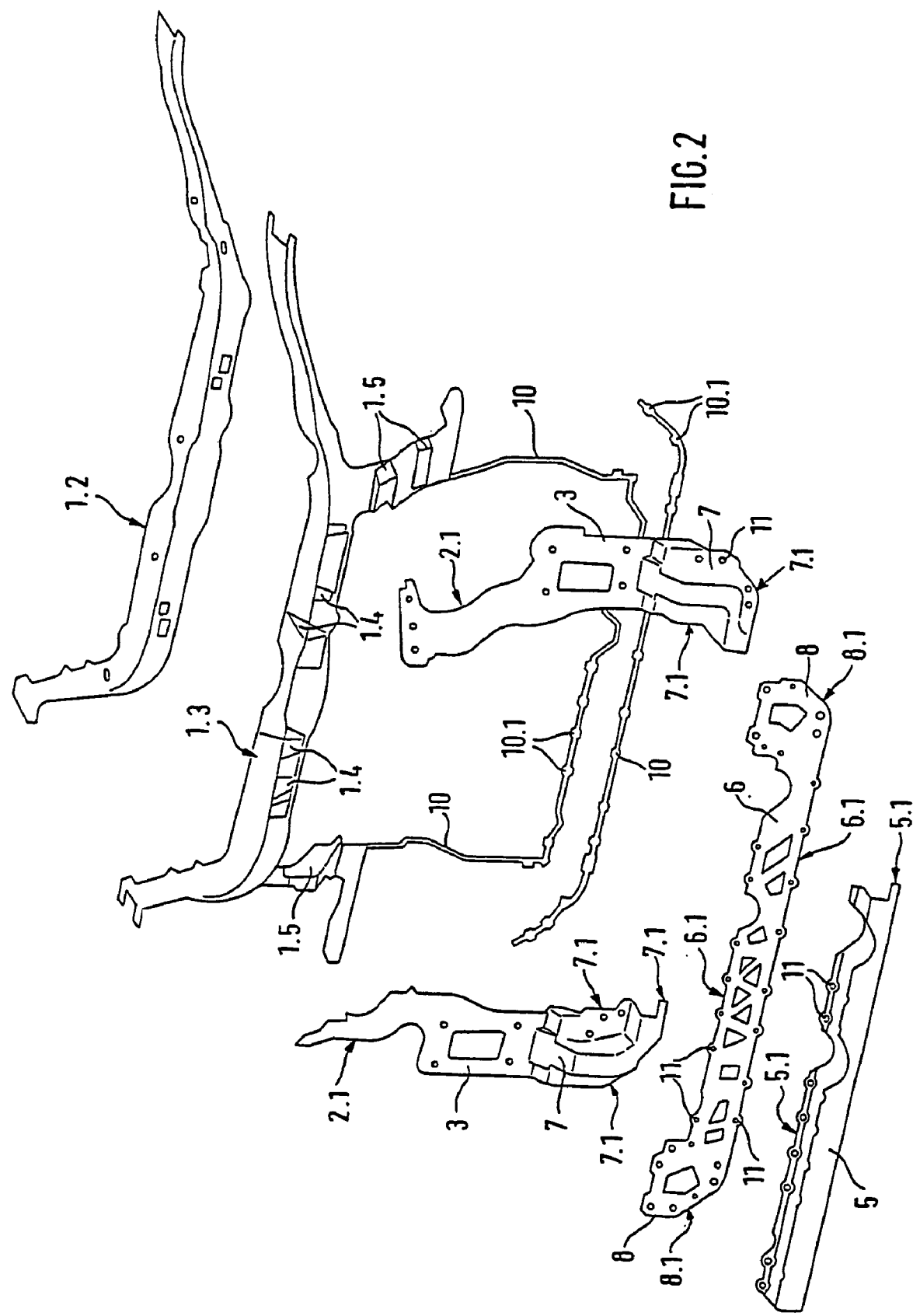
FIG. 2 is a perspective, exploded view of the metal parts and the plastic areas of the assembly support as shown in FIG. 1.

FIG. 2 also shows the metallic parts that form the force-transferring parts of the lateral member 2 and of the lower cross member 4 of the assembly support 1. The upper portions 2.1 of the metallic parts of the lateral member 2 are also formed as hollow shell bodies that are stiffened by means of plastic spars or ribs 1.5. These plastic parts are also formed as one piece with other plastic areas of the hybrid component.

Figure 3:
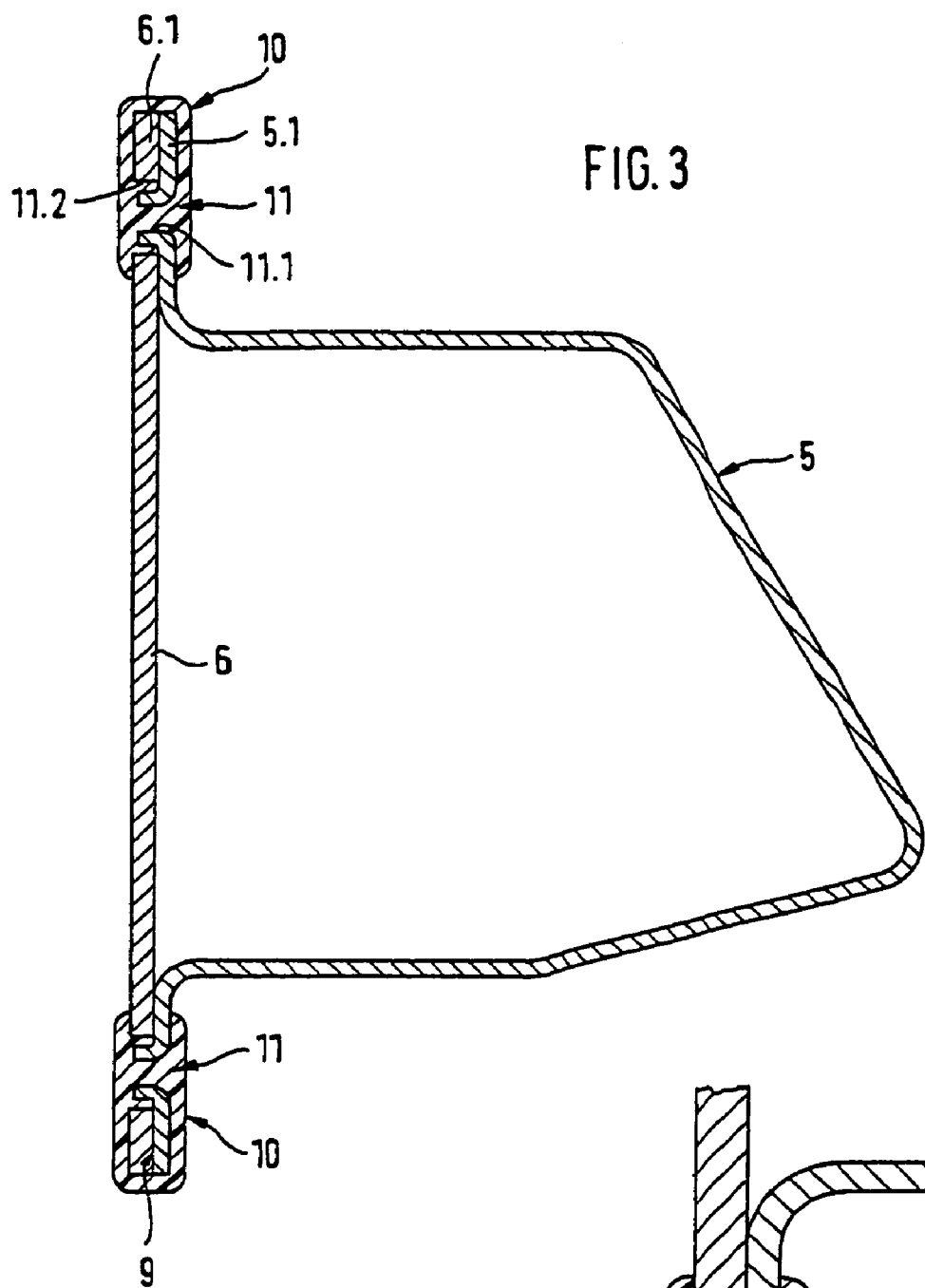
FIG. 3 is a cross section through the lower cross member of the assembly support as shown in FIG. 1 in enlarged view.

A first shell body 5 implemented as a hollow member with an approximately U-shaped cross section belongs to the force-transferring metallic parts formed from plate steel of the lower cross member 4. As shown in FIG. 3, flanges 5.1 are located on the side walls of the shell body 5 facing each other that project and are angled outward. The open side of the concave shell body 5 is closed by a sealing part 6 that is also made of steel and shaped as a flat, plate-shaped component with openings or perforations 6.2. Thus, the sealing part 6 includes an edge area 6.1 that rests flat on the flanges 5.1 of the shell body 5. On both ends of the sealing part 6 are mounted additional sealing parts 8 projecting upward that may basically be provided as separate parts, or as parts firmly affixed to the first sealing part 6. According to the illustrated, advantageous design, the two sealing parts 6 and 8 are largely formed with each other as one piece, whereby the edge areas 6.1 of the first sealing part 6 are continued in edge sections 8.1 of the second sealing part 8.

The second sealing parts 8 are intended for second shell bodies 7 that are shaped into the lower areas of the plate-steel parts of the lateral member 2 that also form the flange plates 3. The second shell bodies 7, like the first shell bodies 5, include edge flanges 7.1 projecting outward that rest on the edge areas 8.1 of the second sealing part 8. The upper sections of the second shell bodies 7 may reach as far as the upper cross member 1 of the assembly support.

The confinement of the shell bodies 5 and 7 with the sealing parts 6 and 8 is provided by means of the plastic sheathing or border 10, which largely possesses a U-shaped cross section in large sections surrounding from without the edge areas 6.1, 8.1 of the sealing parts 6, 8 and the flanges 5.1, 7.1 resting against them. So-called spray-through points are formed at separated locations in these overlapped edge areas 6.1, 8.1 and flanges 5.1, 7.1 whose details may be taken from FIGS. 3 and 4. Apertures 11 aligned with these spray-through points are provided in the flanges 5.1, 7.1 and the edge areas 6.1, 8.1 that may be formed in different ways. A connecting plug or spar is formed of the plastic at the spray-through points, as is shown in FIG. 2 as item 10.1.

Figure 4:
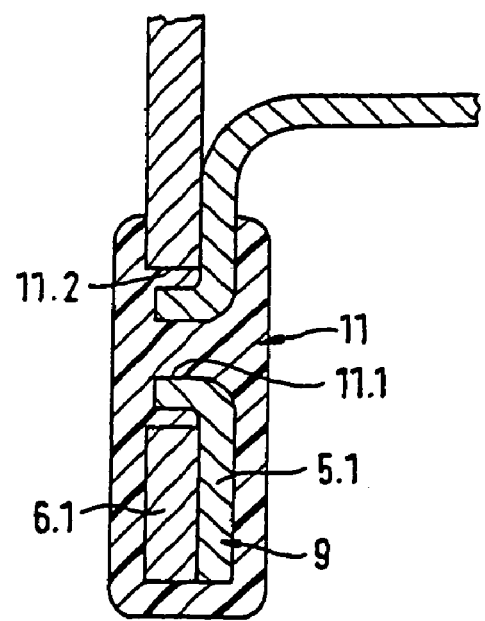
FIG. 4 is a further enlarged view through one of the connecting areas of the two metallic components of the cross member as shown in FIG. 3.

As FIGS. 3 and 4 show, the flanges 5.1, 7.1 of the shell bodies 5, 7 possess apertures 11 in the form of round holes whose edge areas are deformed. Thus, aperture collars are formed about the apertures 11.1 that project at that side of the flanges 5.1, 7.1 against which the edge areas 6.1, 8.1 of the sealing parts 6.8. The second apertures 11.2 in these edge areas 6.1, 8.1 are also round holes, and possess an inner diameter that is larger than the outer diameter of the hole collar 12. The plastic forming the sheathing 10 thus passes not only through the first apertures 11.1 into the flanges 5.1, 7.1 of the shell bodies 5, 7, but also fills the annular gap that is formed between the outer circumference of the hole collars 12 and the inner concave surface of the second apertures 11.2 in the edge areas 6.1, 8.1 of the sealing parts 6, 8. This is shown particularly clearly in FIG. 4. The formation of the injection points as described above is suited not only to connect shell bodies of the revealed type. This type of penetrating injection may also be used when the connection of metal inserts or other inserts of a strong material involves hybrid components manufactured using the plastic injection-molding process.

The present invention is not intended to be limited to a device or method which must satisfy one or more of any stated or implied objects or features of the invention and should not be limited to the preferred, exemplary, or primary embodiment(s) described herein. Modifications and substitutions by one of ordinary skill in the art are considered to be within the scope of the present invention, which is not to be limited except by the allowed claims and their legal equivalents.

The invention claimed is:

1. An assembly support for a front end of passenger vehicles and light trucks, whereby this assembly support is made in hybrid construction using plastic and components of stiff material, and an upper cross member (1), lateral members (2) attached to them and below them with a flange plate (3) for connection with the face ends of vehicle longitudinal members and lower cross member (4) connecting the lower sections (2.1) of the lateral members (2), said assembly support characterized in that the lower cross member (4) consists of a shell body (5) with a flange (5.1) extending along its edge and projecting outward, and of a sealing part (6) overlapping its edge area (6.1) placed upon and in contact with the shell body flange (5.1), whereby the shell body (5) and the sealing part (6) consist of a stiff material, and whereby the flange (5.1) of the shell body (5) and the edge area (6.1) of the sealing part (6) are connected together and with the lateral members (2) by means of the injected plastic used for the hybrid design;

and wherein the lateral member lower sections (2.1) also each consist of a shell body (7) with a flange (7.1) running along the edge and projecting outward and a sealing part (8) with its edge (8.1) overlapping placed on top of it, whereby the shell body (7) and the sealing parts (8) are made of a stiff material and the flange (7.1) of the shell body (7) and the edge areas (8.1) of the sealing parts (8) are connected together and with the other areas of the lateral member (2) and the lower cross member (4) by means of the injected plastic used for the hybrid design; and further wherein the lower cross member (4) and the lower sections (2.1) of the lateral member (2) each include separate shell bodies (5, 7) and the sealing parts (6, 8) connected with these shell bodies (5, 7) by means of the plastic are formed as one piece.

2. The assembly support as in claim 1, wherein the sealing part (6) for the shell body (5) of the lower cross member (4) and the sealing parts (8) for the shell bodies (7) of the lateral member lower section (2.1) are formed as a flat, plate-like component.

3. The assembly support as in claim 1, wherein the sealing part (6) for the shell body (5) of the lower cross member (4) and the sealing parts (8) for the shell bodies (7) of the lateral member lower section (2.1) are formed as shell-shaped profile pieces.

4. The assembly support as in claim 1, wherein the flanges (5.1, 7.1) of the shell bodies (5, 7) and the edge areas (6.1, 8.1) of the sealing parts (6, 8) of the lower cross member (4) and the lateral member (2) together form a flat spar (9), and the injected, binding plastic forms a sheath with a U-shaped cross section.

5. The assembly support as in claim 1, wherein the flanges (5.1, 7.1) of the shell bodies (5, 7) on the one side and the edge areas (6.1, 8.1) of the sealing parts (6, 8) of the lower cross member (4) and the lateral member (2) on the other side possess common transfixing overlapping perforations (11) through which the injected plastic flows.

6. The assembly support as in claim 5, wherein from matching perforations (11) on the flanges (5.1, 7.1) of the shell bodies (5, 7) and the edge areas (6.1, 8.1) of the sealing parts (6, 8), the first perforations (11.1) possess projecting edges formed into hole collars (12) that extend into the second perforations (11.2), whereby the second perforations (11.2) possess a larger inner diameter than the outer diameter of the hole collars (12).

7. The assembly support as in claim 1, wherein the sealing part (6) for the shell body (5) of the lower cross member (4) or the sealing parts (8) for the shell bodies (7) of the lateral member lower section (2.1) are formed as a flat, plate-like component.

8. The assembly support as in claim 1, wherein the sealing part (6) for the shell body (5) of the lower cross member (4) or the sealing parts (8) for the shell bodies (7) of the lateral member lower section (2.1) are formed as shell-shaped profile pieces.

* * * * *